United States Patent
Tondra et al.

(10) Patent No.: US 7,208,892 B2
(45) Date of Patent: Apr. 24, 2007

(54) POWER MANAGEMENT SYSTEM FOR A FLOOR CARE APPLIANCE

(75) Inventors: Aaron P. Tondra, North Canton, OH (US); Evan A. Gordon, Canton, OH (US); Adam C. Sclafani, North Canton, OH (US)

(73) Assignee: The Hoover Company, North Canton, OH (US)

( * ) Notice: Subject to any disclaimer, the term of this patent is extended or adjusted under 35 U.S.C. 154(b) by 546 days.

(21) Appl. No.: 10/444,828

(22) Filed: May 23, 2003

(65) Prior Publication Data

US 2004/0231088 A1 Nov. 25, 2004

(51) Int. Cl.
  H02P 5/00 (2006.01)
  H02P 1/54 (2006.01)
  A47L 5/00 (2006.01)

(52) U.S. Cl. .................. 318/53; 318/34; 318/46; 15/319; 15/339; 15/412; 701/23; 701/25; 701/26

(58) Field of Classification Search ............... 318/34, 318/53, 46; 15/319, 339, 412; 701/23, 25, 701/26
See application file for complete search history.

(56) References Cited

U.S. PATENT DOCUMENTS

| | | | | |
|---|---|---|---|---|
| 4,357,729 A | * | 11/1982 | Vander Molen et al. ....... | 15/319 |
| 4,370,690 A | * | 1/1983 | Baker ........................... | 361/23 |
| 4,654,924 A | * | 4/1987 | Getz et al. ..................... | 15/319 |
| 5,255,409 A | * | 10/1993 | Fujiwara et al. ............... | 15/319 |
| 5,276,939 A | * | 1/1994 | Uenishi ......................... | 15/319 |
| 5,747,973 A | | 5/1998 | Robitaille et al. | |
| 6,323,570 B1 | * | 11/2001 | Nishimura et al. ....... | 310/67 R |
| 6,400,048 B1 | * | 6/2002 | Nishimura et al. ........... | 310/47 |
| 2002/0112315 A1 | | 8/2002 | Conrad | |
| 2002/0145400 A1 | * | 10/2002 | Cashatt ....................... | 318/727 |
| 2003/0229421 A1 | * | 12/2003 | Chmura et al. ............. | 700/245 |
| 2005/0065662 A1 | * | 3/2005 | Reindle et al. ................ | 701/1 |
| 2005/0120504 A1 | * | 6/2005 | Tondra et al. ................ | 15/319 |
| 2005/0278888 A1 | * | 12/2005 | Reindle et al. ............... | 15/319 |

FOREIGN PATENT DOCUMENTS

| | | | |
|---|---|---|---|
| GB | 2199 706 A | | 7/1988 |
| JP | 11178762 A | * | 7/1999 |
| WO | WO 01/50590 A1 | | 12/2001 |

* cited by examiner

*Primary Examiner*—Paul Ip
(74) *Attorney, Agent, or Firm*—A. Burgess Lowe; Michael J. Corrigan

(57) ABSTRACT

A floor care appliance is provided with an improved power management system for controlling the total amount of current provided to at least a first and a second load device of an appliance. The power management system is comprised of a microprocessor, an alternating current voltage source, a voltage regulating circuit, a clamping circuit, at least two load devices, and a MOC and a triac for each of the at least two load devices. The clamping circuit outputs a fixed voltage of 5.7 volts during the positive portion of the ac cycle and a fixed voltage of −0.7 volts during the negative portion of the ac cycle. The fixed voltages are input to a microprocessor which utilizes these inputs to control the average voltage and the amount of time the current is turned on to each of the at least first and second load devices. A current sensing circuit is used to monitor the current to one of the at least two load devices to provide feedback to the microprocessor so that the microprocessor can adjust the average voltage and current to the at least two load devices so that the total current consumed does not exceed a predetermined level.

31 Claims, 3 Drawing Sheets

POWER MANAGEMENT SYSTEM FOR A FLOOR CARE APPLIANCE

BACKGROUND OF THE INVENTION

1. Field of the Invention

This invention relates to floor care, and more specifically, to a floor care appliance having a power management system for limiting the total current the load devices of the appliance can consume.

2. Summary of the Prior Art

Floor care appliances are well known in the art. Typical floor care appliances include upright vacuum cleaners, canister vacuum cleaners, hard floor cleaners, and extractors. It is known to provide floor care appliances with power management systems for managing the current providing to various load devices such as the motor-fan assembly and/or an agitator drive motor.

For example, in U.S. Pat. No. 5,747,973 issued to Robitaille et al. there is provided a regulating switch circuit for conditioning operation of a first load upon operation of a second load wherein the first load and the second load consume electrical energy from a power source. The circuit includes a detecting means for detecting the operation of the second load and a sensing means for sensing an amount a parameter of the electrical energy supplied to at least one of the first and second loads exceeds a predetermined level. A load control device couples at least one of the first and second loads to the power source wherein the load control device has a control terminal. A control circuit is coupled to the control terminal of the load control device and is responsive to the sensing means and the detecting means to variably adjust the electrical energy supplied by the power source to at least one of the first and second loads to limit the parameter of the electrical energy to the predetermined level.

However, this circuit adjusts the current provided to the first and second loads according to a pre-determined level for that particular first and second load. It does not adjust the current provided to the first and second loads according to a pre-determined level that is a total of the current provided to both of the first and second loads. In addition due to the circuit being designed with analog devices, there is little versatility in configuring the circuit according to different parameters. Therefore, there exists a need in the art for a power management system that can control the total current provided to at least a first and a second load utilizing microprocessor technology that is more flexible in configuring the circuit according to different parameters.

Accordingly, it is an object of the invention to provide an improved power management system for limiting the total current provided to at least a first and a second load devices of an appliance.

It is a further object of this invention to provide an improved power management system utilizing microprocessor technology that can be programmed to control the total amount of current provided to at least a first and a second load device of an appliance.

It is yet further an object of this invention to provide an improved floor care appliance capable of being connected to a network.

It is yet still a further object of this invention to provide an improved floor care appliance having a programmable microprocessor for receiving and storing operational data.

SUMMARY OF THE INVENTION

In the preferred embodiment of the invention, an improved power management system is provided for controlling the total amount of current provided to at least a first and a second load device of an appliance. The power management system is comprised of a microprocessor, an alternating current voltage source, a voltage regulating circuit, a clamping circuit, a clamping circuit, at least two load devices, and a MOC and a triac for each of the at least two load devices. The clamping circuit outputs a fixed voltage of 5.7 volts during the positive portion of the ac cycle and a fixed voltage of −0.7 volts during the negative portion of the ac cycle. These voltages are input to a microprocessor so the microprocessor knows when the ac voltage crosses the zero threshold from one portion to another. The microprocessor utilizes these inputs to control the amount of time the current is turned on to each of the at least first and second load devices. The current is turned on to each of the at least first and second load devices by an output from the microprocessor provided to the associated MOC which in turn controls the associated triac for turning the current on to the associated load for the amount of time determined by the microprocessor. One of the at least first and second loads has a sensing circuit which monitors the current drawn by the load. A surge or rise in the current drawn will cause an output from the sensing circuit which is input to the microprocessor. The microprocessor will adjust according to pre-programmed instructions the amount of time the current is turned on and hence the average voltage applied to each of the at least first and second loads so that the total current drawn by all of the at least first and second loads does not exceed a pre-determined value. This requires that the microprocessor reduce the average voltage and current provided to the at least second load to account for the increased amount of current used by the first load.

In one embodiment of the preferred embodiment of the invention, the at least first and second loads are a motor-fan assembly and an agitator drive motor. The pre-determined level or total current that may be drawn by both motors is 12 amps with the agitator drive motor initially programmed to draw 2 amps. This means that the motor-fan assembly can initially draw 10 amps. An increase in the load placed on the agitator drive motor will cause the amount of current drawn by the agitator drive motor to exceed 2 amps. Necessarily, the microprocessor will adjust the current provided to the motor-fan assembly to less than ten amps. An increase in load an the agitator may be associated with the type of surface being cleaned such as bare floors, type of carpets, rugs, draperies, etc.

In an alternate preferred embodiment of the invention, a floor care appliance having a programmable microprocessor is provided wherein the microprocessor is programmed to store operational parameters of the appliance as well as real time performance data. The microprocessor is capable of being connected to a network wherein the programmed operational parameters may be changed through a remote interface connected to the network and the real time performance data uploaded to the interface. The performance data can then be evaluated to determine the operating condition of the cleaner for repair and maintenance purposes. The performance data may also be used to determine adjustments to be made to the operating parameters of the appliance which are downloaded to the microprocessor over the network.

BRIEF DESCRIPTION OF THE DRAWINGS

Reference may now be had to the accompanying drawings for a better understanding of the invention, both as to its organization and function, with the illustration being only exemplary and in which.

DETAILED DESCRIPTION OF THE INVENTION

Figure 1:
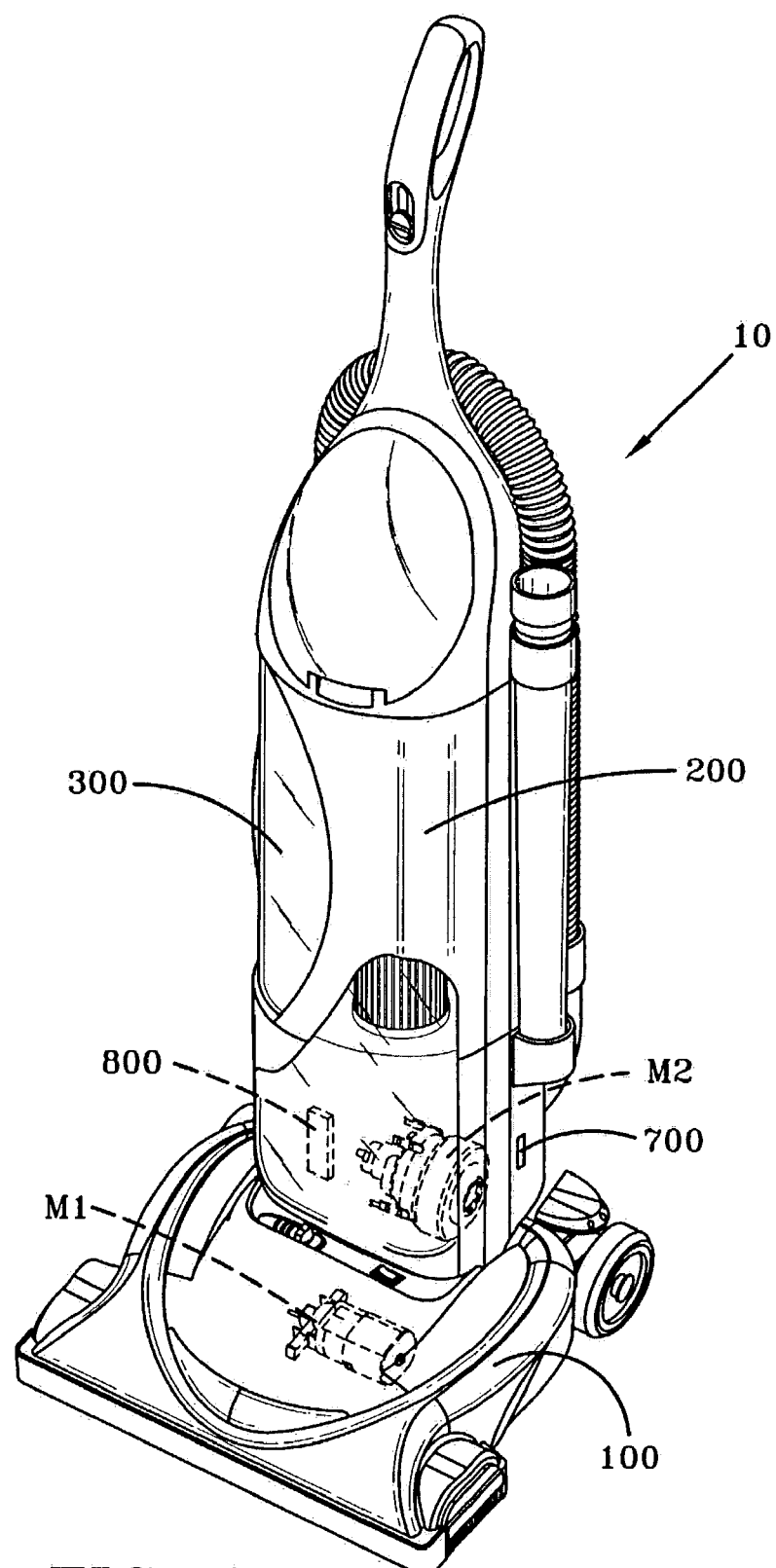
FIG. 1 is a perspective view of an upright vacuum cleaner having an improved power management system, according to the preferred embodiment of the present invention.
Figure 2:
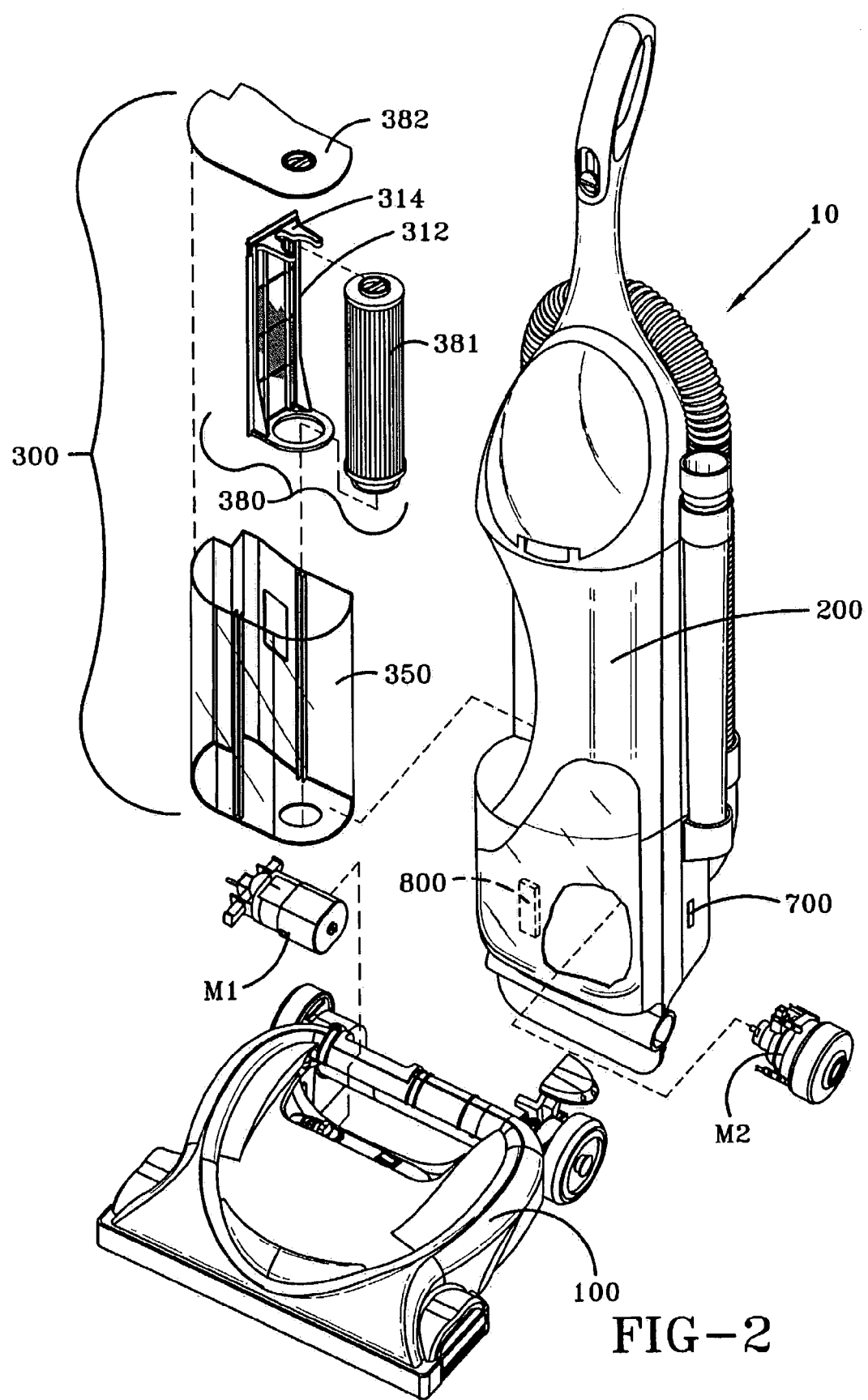
FIG. 2 is an exploded perspective view the upright vacuum cleaner of FIG. 1, according to the preferred embodiment of the present invention.

Referring now to FIGS. 1 and 2, shown is an upright vacuum cleaner 10 having an improved power management system 500. Upright vacuum cleaner 10 includes a foot 100 and an upper housing assembly 200 pivotally connected to foot 100. Foot 100 is similar to those known in the art and includes a nozzle opening (not shown) for receiving a stream of dirt-laden air and an agitator (not shown) for agitating and loosening dust and debris from a floor surface when upright vacuum cleaner 10 is in the floorcare mode. Foot 100 further includes a pair of front wheels (not shown) rotatably mounted on a wheel carriage (not shown), and a pair of rear wheels 130.

Located in foot 100 or upper housing 200 is a motor-fan assembly M2 which creates the suction necessary to remove the loosened dust and debris from the floor surface. The motor-fan assembly M2 fluidly connects to foot or suction nozzle 100 by a dirt duct (not shown). The upper housing assembly 200 houses a particle filtration and collecting system 300 for receiving and filtering the dirt-laden air stream which is created by the motor-fan assembly M2. The particle filtration and collecting system 300 may be interposed in the dirt laden airstream between the suction nozzle 100 and the motor-fan assembly M2 as in an "indirect air" system seen in FIG. 1 or the motor-fan assembly M2 may be interposed between the suction nozzle 100 and the particle filtration and collecting system 300 as in a "direct air" system. An independent electric agitator drive motor M1 is provided for providing rotary power for at least one rotary agitator (not shown). Motor-fan assembly M2 and agitator drive motor M1 are controlled by a power management system 800 located in the upper housing 200. Although power management system 800 may be located anywhere on the floor care appliance 10, including foot 100, it desirable to have power management system 800 located in a moving airstream such as the exhaust for motor-fan assembly M2 for cooling purposes. Power management system 800 is shown in FIG. 1 in the form of a snap-in module but may be constructed in numerous other ways. A detailed description of the composition and operation of power management system 800 is given below.

Referring now to FIG. 2, shown is an exploded view of a floor care appliance 10 with a preferred embodiment dirt collecting system 300. Dirt collecting system 300 generally includes a translucent dirt cup 350, a filter assembly 380 removably mounted within the dirt cup 350 and a dirt cup lid 382 which encloses the dirt cup 350. Filter assembly 380 generally includes an apertured wall 312, a filter support 314 extending from the apertured wall 312 and a primary filter member 381 which removably mounts on the filter support 314. The filter assembly 380, and particularly the apertured wall 312 thereof, along with the partition wall 310 separate the dirt cup chamber 394 into a first dirt collecting chamber 316 and a second dirt collecting chamber 318. The apertured wall 312 is positioned between rear wall 386 and front wall 392 and is formed with a plurality of apertures or holes 320. The holes 320 provide for fluid communication between the first dirt collecting chamber 316 and the second dirt collecting chamber 318. The apertured wall 312 functions as a coarse particle separator or pre-filter and could include any number of holes having various shapes (circular, square, elliptical, etc.), sizes and angles. To maximize airflow through the holes while still preventing large debris from passing therethrough, it is desirable to form the holes as large as 0.0036 square inches and as small as a 600 mesh screen. In the present embodiment, the holes 312 are circular with a hole diameter of approximately 0.030 inches. Further, the apertured wall should be formed with enough total opening area to maintain airflow through the dirt cup. It is desirable to form apertured wall 312 with a total opening area of between approximately 2.5 square inches to approximately 4 square inches. Complete details of the dirt collecting system 300 can be found in Hoover Case 2521, application Ser. No. 09/519,106, owned by a common assignee and incorporated be reference fully herein.

On the lower portion of upper housing 200 is a data port 700 for connecting floor care appliance 10 to a network. A microprocessor 810 (FIG. 3) located in floor care appliance 10 may be used to control various features of floor care appliance 10. The microprocessor 810 may be part of power management system 800 or otherwise. A microprocessor 810 used for this purpose usually is pre-programmed at the factory with the floor care appliance's 10 operational parameters or it may be programmed at final assembly to account for variations in the cleaner during the assembly process. Upon connection of floor care appliance 10 to a network, the operational parameters may be changed through the remote interface connected to the network. The microprocessor 810 could also be programmed to collect and store real time performance data which may also be uploaded to the interface via the network The performance data can be evaluated to determine the operating condition of the floor care appliance 10 cleaner for repair and maintenance purposes. The performance data may also be used to determine adjustments that could made to the operating parameters of the appliance to improve performance which are downloaded to the microprocessor 810 over the network. Examples of such performance data could include a log of the running time of motors, cleaner suction, agitator brush life, current used, and vibration analysis. Other such date could be operational data related to appliance floor height adjustment, response characteristics for a propulsion drive arrangement, bag full conditions, belt conditions, etc.

Figure 3:
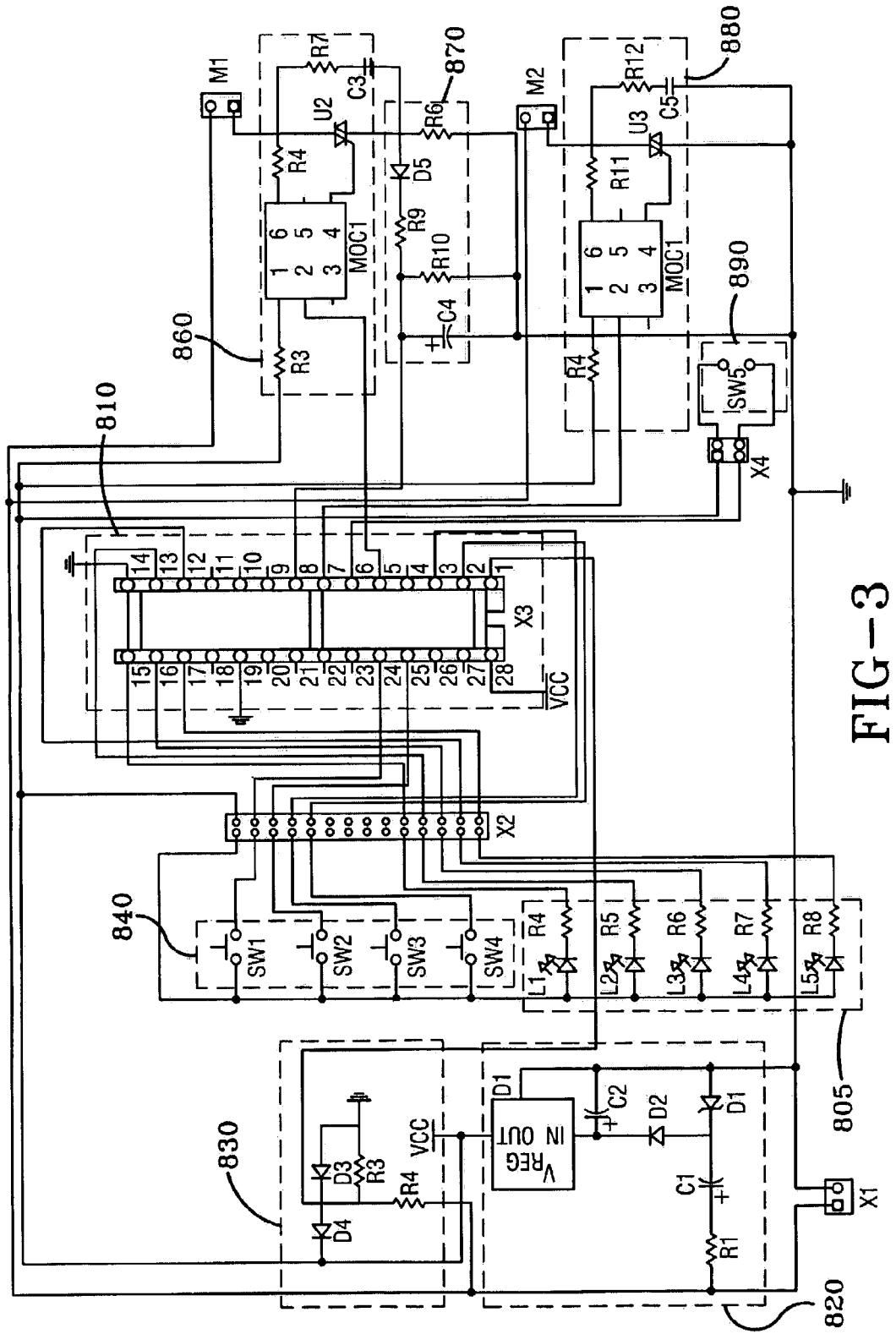
FIG. 3 is an electrical schematic of the improved power management system, according to the preferred embodiment of the present invention.

Referring now to FIG. 3, shown is an electrical schematic of the preferred embodiment of an improved power management system 800. Power management system 800 is comprised of a microprocessor 810, an alternating current voltage source 805, a voltage regulating circuit 820, a clamping or "zero cross detecting circuit" 830, at least two load devices M1 and M2, at least a first load driver circuit 860 and a second load driver circuit 880, a sensing circuit 870 for sensing the current drawn by one of the at least two load devices M1 and M2, a plurality of switches $SW_1$ to $SW_4$ for controlling various floor care appliance 10 features, and a plurality of light emitting diodes $Id_1$ to $Id_5$ whereon one light emitting diode $Id_x$ may be associated with one of said plurality of switches $SW_1$ to $SW_4$. A switch $SW_5$ is provided for powering the appliance on and off. The clamping or "zero cross" circuit 830 outputs a fixed voltage of 5.7 volts during the positive portion portions of the ac cycle and a −0.7 volts during the negative portion of the ac cycle. Thus, clamping circuit 830 acts as a "zero cross detector" at any given time as the fixed voltages of 5.7 volts and −0.7 volts are input to a microprocessor 810 so the microprocessor 810 knows when the ac cycle is crossing the "zero voltage threshold" and which portion of the ac cycle is currently in phase. In the preferred embodiment of the invention, the fixed voltages are 5.7 volts and −0.7 volts but the fixed voltages could be different values in other embodiments. The microprocessor 810 is programmed to utilize these inputs to control the average voltage applied to each of the at least first and second load devices M1 and M2. The microprocessor 810 has internal timers for each of the at least two load devices M1 and M2 that start timing the amount of time the current is turned on to and the average voltage applied to each of the at least two load devices M1 and M2 each time the ac current crosses past the "zero voltage threshold". The current is turned on to each of the at least first and second load devices M1 and M2 by an output from the microprocessor 810 provided to an associated triac driver device MOC1 and MOC2 known as a "MOC" which in turn controls an associated triac U1 and U2 which when activated turns the current on to an associated load device M1 and M2. A triac driver device or "MOC" model no. MOC3010-M made by Fairchild Semiconductor of South Portland, Me. has been found to be suitable for this purpose. One of the at least first and second loads M1 and M2 has a sensing circuit 870 associated with it which monitors the current drawn by the load device M1 and M2. In the preferred embodiment, the current sensing circuit 870 is associated with M1. A surge or rise in the current drawn by the load device M1 will cause an output from the sensing circuit 870 which is input to the microprocessor 810. The microprocessor 810 will adjust according to pre-programmed instructions or a table of values the average voltage applied to and the amount of time the current is turned on to each of the at least first and second loads M1 and M2 so that the total current drawn by all of the at least first and second loads M1 and M2 does not exceed a pre-determined value. This requires that the microprocessor 810 reduce the current and average voltages provided to the at least second load device M2 to account for the increased amount of current used by the first load device M1. Alternately, instead of a table of values a mathematical relationship could be programmed into the microprocessor for this purpose. When the load on the second load device M2 is reduced, the microprocessor's 810 programming will reduce the amount of time that current is turned on to the first load M1 while increasing the amount of time the current is turned on to the second load M2 such that the total current used by both the first and second load M1 and M2 does not exceed the predetermined value.

In one embodiment of the preferred embodiment of the invention, the at least first and second loads M1 and M2 are a motor-fan assembly and an agitator drive motor. The pre-determined level or total current that may be drawn by both motors is 12 amps with the agitator drive motor M1 initially programmed to draw 2 amps. This means that the motor-fan assembly M2 can initially draw 10 amps. An increase in the load placed on the agitator drive motor M1 will cause the amount of current drawn by the agitator d rive motor M1 to exceed 2 amps. Necessarily, the microprocessor 801 will adjust the current provided to the motor-fan assembly M2 to less than ten amps. Note that this is only one possible configuration as additional loads M3 through $M_n$ may be added and the microprocessor 810 can be programmed to adjust the current to each of the loads M1 through $M_n$ as the current increases in one of the M1 through $M_n$ loads so that the sum total current used by all loads M1 through $M_n$ does not exceed a predetermined value. With the use of switches $SW_1$ to $SW_4$ to turn various features on and off, the microprocessor 810 can control the current to each of the loads M1 through $M_n$ that remain on so that the total current drawn by the loads M1 through $M_n$ does not exceed a pre-determined level. The entire power management system 800 could be embedded on a plug in module which simplifies assembly of floor care appliance 10 and replacement and/or upgrade of power management assembly 800.

Power is supplied to power management system 800 by an ac voltage source 805 which is typically 120 vac at 60 hz. The 120 vac line voltage is reduced through a resistor R1 and capacitor C1 and then the Zener diode D1 which clamps the voltage to around 30 vac. In the preferred embodiment of the invention, R1=220 ohms, C1=4.7 microfarads and D1 is a 30 volt Zener diode. The 30 vac voltage is half-wave rectified to direct current through the diode D2 and smoothed through a capacitor C2. In the preferred embodiment of the invention, D2 is a 1N4003 diode and C2=1000 microfarads. The smoothed direct current is fed into a voltage regulator U1 that outputs a regulated 5 vdc voltage from the 10–35 vdc input. This 5 vdc power is then supplied to the microprocessor and the other low voltage devices and controls discussed above. Note that in other embodiments of the invention the voltage can be regulated to other voltages and the at least two loads M1 and M2 can be powered by direct current at various voltages.

The 120 vac voltage source 805 also has its voltage dropped through the resistive divider R2 and R3. In the preferred embodiment of the invention, R2=1 Mega ohm and R3=100 K ohms. On the positive half of the AC wave, the upper diode D4 conducts and the output signal is clamped to 5.7 vdc. On the negative half of the AC wave, the lower diode D3 conducts and the output signal is clamped to 0 or −0.7 vdc. In the preferred embodiment of the invention, D3 and D4 are 1N4003 diodes. This square wave pulse train coincides with the zero crossing of the main 120 vac line. This signal is fed into the microprocessor 810 and used to sequence the firing of motors M1 and M2 (or other load devices M3 through $M_n$) with the main ac voltage line based upon the zero crossing.

The switches $SW1$ through $SW_n$ look for a transition from 0 vdc to 5 vdc or vice versa to recognize a valid press. Each switch SW, to $SW_n$ corresponds with a different mode, feature or speed selection. The LED's L1 through $L_n$ and associated resistors R4 through $R_n$ are used for indication of which mode, feature or speed is currently selected. In the preferred embodiment of the invention, resistors R4 through R7=680 ohms.

Each of the load driver circuits 870 and 880 is comprised of a MOC 1 and MOC 2, respectively used for firing triacs U2 and U3, respectively. MOC 1 and MOC 2 are devices that are used to either block or pass a portion of the 120 vac power to laod devices M1 and M2. When a valid zero cross is determined, timers internal to microprocessor 810 start timing and when the preset time is reached the input signal to MOC 1 and MOC 2 is toggled and the device will allow a portion of the 120 vac wave to pass. The preset times can range from 0 to 7 miliseconds depending on the average voltage that needs to be passed to M1 and M2. Triacs U2 and U3 are devices that switch on and off allowing current to flow to M1 and M2 based upon MOC 1 and MOC 2 and the timing signal coming through the microprocessor 810. The amount of time the timers will allow the current to pass to the at least two load devices such as M1 and M2 can be programmed into a table of values with each time corresponding to an average voltage applied to the at least two load devices such as M1 and M2 and a value input from a current sensing circuit 870 more fully described hereinbelow. In the preferred embodiment of the invention, R4 and R5=330 ohms, R6 and R11=150 ohms, R7 and R12=10 ohms, and C3 and C5=100 nanofarads.

Current sensing circuit 870 is a low ohm power resistor or linear hall effect sensor that generates a voltage with respect to the current through the agitator motor. That low voltage AC signal is half-wave rectified through a diode, filtered and smoothed through a resistive/capacitive network. That signal is then fed into an A/D pin on the microprocessor 810 where it is used to determine the load on M1. Based upon the load on M1, decisions can be made to change the speeds of M1 and M2 based upon the surface being cleaned, stall detection, etc. In the preferred embodiment of the invention, R1=1 k ohm, C4=1 microfarad, R8=0.47 ohms, R10=1 Mega ohms and D5 is an 1N4003 diode.

In an alternate embodiment of the invention, a microprocessor 810 such as the one in power management system 800 or other microprocessor could be configured and programmed to collect and store data related to the operating parameters of the floor care appliance 10 such as was heretofore described related to the control of the current supplied to the at least first and second loads M1 and M2. However, there could be an infinite number of possibilities as to what may be programmed into the microprocessor 810 or other microprocessor as various known and heretofore unknown features are added to floor care appliance 10. The microprocessor 810 or other microprocessor could also be programmed to collect and store real time performance data related to the performance and operation of floor care appliance 10. The performance data can then be evaluated to determine the operating condition of the floor care appliance 10 for repair and maintenance purposes. The performance data may also be used to determine adjustments to be made to the operating parameters of the floor care appliance 10 which are downloaded to the microprocessor 810 or other microprocessor over a network connected to a remote interface. A data port connected to the microprocessor 810 or other microprocessor is provided on floor care appliance 10 for this purpose. Data port 700 may be one of several types of data ports such as USB, serial, parallel, RJ-11 or other known or unknown data ports. In the most likely connection arrangement, a floor care appliance 10 is connected via a USB cable to a personal type computer which is further connected to the Internet. The personal computer user may upload or retrieve performance data from the appliance 10 and then upload the data to 1a remote site via the Internet. The remote site will typically be an appliance repair facility which will analyze the data for the appliance's performance and possible malfunctions. The repair facility may also transmit new operational parameters to be downloaded to appliance 10 based upon the analysis of the performance data. Upgrades to the operational parameters of the appliance 10 may also be provided by the repair facility or posted on a web site for retrieval by the end user at the personal computer site. Upgrade or repair data could also be distributed on other computer storage media such as a CD-ROM for installation by the end user at the personal computer site.

It should be clear from the foregoing that the described structure clearly meets the objects of the invention set out in the description's beginning. It should now also be obvious that many changes could be made to the disclosed structure which would still fall within its spirit and purview.

The invention claimed is:

1. A power management system for processing an alternating electrical current supplied to an appliance configured to communicate with a communication network, said system comprising:
   a zero cross detector circuit to generate an output indicating when the alternating current crosses a zero voltage threshold;
   at least two load devices;
   a microprocessor maintaining one or more operational parameters for controlling the performance of said at least two load devices, said microprocessor configured to receive the output from the zero cross detector circuit and to generate an output to control the voltage applied to each of said at least two load devices; and
   a data port coupled to said microprocessor, said data port configured to be associated with the communication network, wherein said operational parameters maintained by said microprocessor may be changed via said data port;
   wherein said microprocessor controls the voltage applied to each of said at least two load devices such that the total current consumed by said at least two load devices does not exceed a pre-determined level.

2. The power management system of claim 1, further including at least two load device trigger circuits wherein one load device trigger circuit is associated with one of said at least two load devices for turning the current on to the associated load device.

3. The power management system of claim 1, wherein said microprocessor controls the average voltage applied to each of said at least two load devices with an associated timer which is reset each time said microprocessor detects the alternating current crossing the zero voltage threshold, said microprocessor being pre-programmed with a table of values having an amount of time each timer is on associated with a voltage to be applied to each of the at least two load devices.

4. The power management system of claim 3, wherein said microprocessor receives said input from said at least one sensing circuit and the amount of time each timer associated with each of said at least two load devices is based upon said input according to an amount of time programmed in the table of values associated with a voltage to be applied to all of said at least two load devices such that the total current does not exceed a pre-determined value.

5. The power management system of claim 1, wherein said at least two load devices are electric motors.

6. The power management system of claim 1, wherein said pre-determined level is 12 amps.

7. The power management system of claim 1, wherein said pre-determined level is 12 amps and one of said at least two load devices consumes 10 amps and another of said at least two load devices consumes 2 amps.

8. The power management system of claim 1, wherein said pre-determined level is 12 amps and one of said at least two load devices consumes 9.5 amps and another of said at least two load devices consumes 2.5 amps.

9. The power management system of claim 1, wherein said microcontroller is configured to collect performance data associated with the operation of the appliance.

10. The power management system of claim 9, wherein said microcontroller enables said collected performance data to be output to the communication network via said data port.

11. The power management system of claim 10, wherein said microprocessor.

12. A power management system for processing an alternating electrical current supplied to an appliance and configured to communicate with a communication network, said system comprising:
- a zero cross detector circuit for generating an output indicating when the alternating current crosses a zero threshold;
- at least two load devices:
- a microprocessor maintaining one or more operational parameters for controlling the performance of said at least two load devices, said microprocessor configured to receive the output from the zero cross detector circuit and generating an output;
- a data port coupled to said microprocessor, said data port configured to be associated with the communication network, wherein said operational parameters maintained by said microprocessor may be changed via said data port;
- at least one current sensing circuit for sensing the amount of current consumed by one of said at least two load devices and generating an input to said microprocessor corresponding to the amount of current consumed; and
- at least two load device trigger circuits, wherein one of said at least two load device trigger circuits is associated with one each of said at least two load devices;
- wherein each of said at least two load device trigger circuits turns on the current to the associated load device upon receiving said output from said microprocessor, said microprocessor generating said output to each of said at least two load device trigger circuits such that a change in the amount of current being consumed by said one load device associated with said at least one current sensing circuit will cause the microprocessor to adjust the output to each of said at least two load devices such that the total current consumed by all of said at least two load devices does not exceed a predetermined amount.

13. The power management system of claim 12, further including at least two load device trigger circuits wherein one load device trigger circuit is associated with one of said at least two load devices for turning the current on to the associated load device.

14. The power management system of claim 12, wherein said microprocessor controls the average voltage applied to each of said at least two load devices with an associated timer which is reset each time said microprocessor detects the alternating current crossing the zero voltage threshold, said microprocessor being pre-programmed with a table of values having an amount of time each timer is on associated with an average voltage to be applied to each of the at least two load devices.

15. The power management system of claim 14, wherein said microprocessor receives said input from said at least one sensing circuit and the amount of time each timer associated with each of said at least two load devices is on is adjusted based upon said input according to an amount of time programmed in the table of values associated with an average voltage such that the total amount of current supplied to all of said at least two load devices does not exceed a pre-determined value.

16. The power management system of claim 12, wherein said microcontroller is configured to collect performance data associated with the operation of the appliance.

17. The power management system of claim 16, wherein said microcontroller enables said collected performance data to be output to the communication network via said via said data port.

18. The power management system of claim 17, wherein said microprocessor enables at least one of said one or more operational parameters to be modified based on said collected performance data output from said data port.

19. A power management system to process an alternating electrical current supplied to a floor care appliance, said system comprising:
- a zero cross detector circuit configured to generate an output indicating when the alternating current crosses a zero voltage threshold;
- at least two load devices; and
- a microprocessor coupled to said at least two load devices and to said zero cross detector circuit, said microprocessor configured to receive the output from the zero cross detector circuit;
- wherein in response to the receipt of said output generated by said zero cross detector, said microprocessor controls the amount of current supplied to said at least two load devices by monitoring the amount of time the current is turned on to each of said load devices after said zero cross detector generates said output indicating said zero voltage threshold, such that the total current applied to each said at least two load devices does not exceed a pre-determined level.

20. The power management system of claim 19, further including at least two load device trigger circuits wherein one load device trigger circuit is associated with one of said at least two load devices for turning the current on to the associated load device.

21. The power management system of claim 19, wherein said microprocessor controls the current applied to each of said at least two load devices said microprocessor switching the electrical current after a predetermined amount of time so that the amount of current applied to said at least two load devices does not exceed a predetermined value.

22. The power management system of claim 21, wherein said microprocessor is coupled to at least one sensing circuit to sense the current drawn by one of said at least two load devices, such that if said sensing circuit detects a change of current drawn by one of said at least two load devices, said microprocessor adjusts the amount of time the current is turned on to each of the other load devices, such that the total amount of current consumed by said at least two load devices does not exceed a pre-determined value.

23. The power management system of claim 19, wherein said microcontroller is configured to collect performance data associated with the operation of the appliance.

24. The power management system of claim 23, wherein said microcontroller enables said colleted performance data to be output to the communication network via said data port.

25. The power management system of claim 24, wherein said microprocessor enables at least one of said one or more operational parameters to be modified based on said collected performance data output from said data port.

26. A method of managing the power supplied to an appliance via a microprocessor controlling at least two load devices, the microprocessor maintaining a data port for communicating with a network, the method comprising the steps of:
- maintaining at the microprocessor at least one operational parameter for controlling the performance of the at least two load devices;
- detecting at the microprocessor when the alternating current of the power supplied to the appliance crosses the zero voltage threshold;
- detecting the amount of current drawn at each of the at least two load devices;
- controlling the average voltage applied to the at least two load devices based upon when the alternating current crosses the zero voltage threshold such that the total amount of current consumed by the at least two load devices does not exceed the value associated with said operational parameter; and
- modifying said operational parameter maintained by the microprocessor via the data port.

27. The method of managing the power in an appliance of claim 26, including the steps of:
- associating a timer with each of the at least two load devices for controlling the average voltage applied to each of the at least two load devices;
- determining the amount of current consumed by one of said at least two load devices;
- inputting the amount of current consumed by one of said at least two load devices to the microprocessor;
- varying the average voltage applied to the at least two load devices based upon the current consumed by the one of said at least two load devices as identified at said determining step, whereby said average voltage to be applied to the at least two load devices being determined by a table of average voltages associated with a time said timer turns the current on to each of said at least two load devices.

28. The method of managing the power in an appliance of claim 26, further comprising:
- collecting performance data associated with the operation of the appliance.

29. The method of managing the power in an appliance of claim 28, further comprising:
- downloading said performance data from the appliance via the data port; and
- modifying said at least one operational parameter based on performance data obtained at said downloading step.

30. The method of managing the power in an appliance of claim 29, further comprising:
- uploading said modified at least one operational parameter to the appliance via the data port.

31. A power management system for processing an alternating electrical current supplied to an appliance configured to communicate with a communication network, said system comprising:
- a zero cross detector circuit to generate an output indicating when the alternating current crosses a zero voltage threshold;
- at least two load devices;
- a microprocessor maintaining one or more operational parameters for controlling the performance of said at least two load devices, said microprocessor configured to receive the output from the zero cross detector circuit and to generate an output to control the voltage applied to each of said at least two load devices; and
- a data port coupled to said microprocessor, said data port configured to be associated with the communication network, wherein said operational parameters maintained by said microprocessor may be changed via said data port;
- wherein said microprocessor controls the voltage applied to each of said at least two load devices such that the total current consumed by said at least two load devices does not exceed a pre-determined level, and said microcontroller is configured to collect performance data associated with the operation of the appliance, said microprocessor enabling at least one of said one or more operational parameters to be modified based on said collected performance data output from said data port.

* * * * *